3,258,507
POLYCHLOROETHYL DIALKYL MONOTHIO-
PHOSPHATES AND PROCESS OF PREPAR-
ING POLYHALOETHYL AND TRIHALO-
VINYL MONOTHIOPHOSPHATES
Jack Hensel, Fairway, and Paul C. Aichenegg, Prairie Village, Kans., assignors to Chemagro Corporation, New York, N.Y., a corporation of New York
No Drawing. Original application Dec. 12, 1961, Ser. No. 158,888, now Patent No. 3,184,377, dated May 18, 1965. Divided and this application May 11, 1964, Ser. No. 366,609
9 Claims. (Cl. 260—963)

This application is a division of application Serial No. 158,888, filed December 12, 1961, now U.S. Patent No. 3,184,377.

The present invention relates to thiophosphates, methods for making the same, and their use as pesticides.

An object is to prepare novel S-polyhaloethyl thiophosphates.

An additional object is to devise a novel procedure for preparing S-polyhalo ethyl thiophosphates.

Yet another object is to develop improved compositions and processes for killing namatodes A still further object is to develop improved compositions and processes for killing insects.

An additional object is to develop improved compositions and processes for killing fungi.

A further object is to develop improved compositions and processes for killing bacteria.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formula

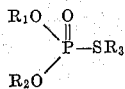

where $R_1$ and $R_2$ are hydrocarbon or haloaryl and $R_3$ is polyhalovinyl or is di or trihaloethyl or tetrahaloethyl. The halogen atoms are either chlorine or bromine. Preferably all of the halogen atoms are chlorine. These compounds where $R_3$ is haloethyl are novel.

In the present specification and claims in describing the compounds of the present invention it will be understood that the only sulfur atom on the thiophosphate is that which is attached to the polyhalo vinyl or polyhalo ethyl group, i.e., the compounds prepared are O,O-dihydrocarbon (or haloaryl) -S-polyhalo vinyl (or polyhalo ethyl) phosphorothioates.

Examples of compounds which are either novel or can be used according to the present invention are O,O-dimethyl-S-(1,2-dichlorovinyl) thiophosphate,
O,O-diethyl-S-(1,2-dichlorovinyl) thiophosphate,
O,O-dibutyl-S-(1,2-dichlorovinyl) thiophosphate,
O,O-di-2-ethylhexyl-S-(1,2-dichlorovinyl) thiophosphate,
O,O-dimethyl-S-(1,2,2-trichloroethyl) thiophosphate,
O,O-diethyl-S-(1,2,2-trichloroethyl) thiophosphate,
O,O-dibutyl-S-(1,2,2-trichloroethyl) thiophosphate,
O,O-di-2-ethylhexyl-S-(1,2,2-trichloroethyl) thiophosphate,
O,O-dimethyl-S-(2,2-dichlorovinyl) thiophosphate,
O,O-diethyl-S-(2,2-dichlorovinyl) thiophosphate,
O,O-diphenyl-S-(1,2-dichlorovinyl) thiophosphate,
O,O-diphenyl-S-(2,2-dichlorovinyl) thiophosphate,
O,O-diethyl-S-(1,2,2-trichlorovinyl) thiophosphate,
O,O-dimethyl-S-(2,2,2-trichloroethyl) thiophosphate,
O,O-diethyl-S-(2,2,2-trichloroethyl) thiophosphate,
O,O-diphenyl-S-(2,2,2-trichloroethyl) thiophosphate
O,O-diethyl-S (1,2-dichloroethyl) thiophosphate,
O,O-diethyl-S (2,2-dichloroethyl) thiophosphate,
O,O-dipropyl-S (1,2-dichlorovinyl) thiophosphate,
O,O-dipropyl-S (2,2-dichlorovinyl) thiophosphate,
O,O-dipropyl-S-(1,2,2-trichlorovinyl) thiophosphate,
O,O-dipropyl-S-(1,2,2-trichloroethyl) thiophosphate,
O,O-dipropyl-S-(2,2,2-trichloroethyl) thiophosphate,
O,O-diethyl-S-(1,2,2,2-tetrachloroethyl) thiophosphate,
O,O-diisopropyl-S-(1,2,2-trichlorovinyl) thiophosphate,
O,O-diisopropyl-S-(2,2-dichlorovinyl) thiophosphate,
O,O-diisopropyl-S-(1,2-dichlorovinyl) thiophosphate,
O,O-diisopropyl-S-(2,2,2-trichloroethyl) thiophosphate,
O,O-diisopropyl-S-(1,2,2-trichloroethyl) thiophosphate,
O,O-di p-tolyl-S-(1,2-dichlorovinyl) thiophosphate,
O,O-di o-tolyl-S-(1,2-trichlorovinyl) thiophosphate,
O,O-di xylyl-S-(2,2,2-trichloroethyl) thiophosphate,
O,O-di-p-chlorophenyl-S-(1,2-dichlorovinyl) thiophosphate
O,O-di-o-chlorophenyl (2,2-dichlorovinyl) thiophosphate,
O,O-di-m-chlorophneyl (1,2,2-trichlorovinyl) thiophosphate,
O,O-di-o-bromophenyl (1,2,2-trichloroethyl) thiophosphate,
O-methyl-O-ethyl-S-(1,2-dichlorovinyl) thiophosphate,
O-ethyl-O-propyl-S-(1,2,2-dichlorovinyl) thiophosphate,
O-ethyl-O-isopropyl-S-(2,2,2-trichloroethyl) thiophosphate,
O,O-dimethyl-S-(1,2-dibromovinyl) thiophosphate,
O,O-diethyl-S-(2,2-dibromovinyl) thiophosphate
O,O-diethyl-S-(1,2,2-tribromovinyl) thiophosphate,
O,O-diethyl-S-(2,2,2-tribromoethyl) thiophosphate,
O,O-dimethyl-S-(1,2,2-tribromoethyl) thiophosphate,
O,O-dimethyl-S (1-bromo-2-chlorovinyl) thiophosphate,
O,O-dichlorohexyl-S-(1,2-dichlorovinyl) thiophosphate and
O,O-dicyclohexyl-S-(1,2,2-trichloroethyl) thiophosphate.

For most of the uses it is preferred that $R_1$ and $R_2$ in the generic formula above be an alkyl group of not over 3 carbon atoms. Peak activity as nematocides appears to be when $R_1$ and $R_2$ are ethyl. When $R_3$ is the 1,2-dichlorovinyl isomer the compounds show superior activity to the corresponding 2,2-dichlorovinyl isomer as nematocides. The best nematocide tested was O,O-diethyl-S-(1,2-dichlorovinyl) thiophosphate. It was equal to or better than dimethyl 2,2-dichlorovinyl phosphate (DDVP).

The lower alkyl 1,2,2- trichloroethyl thiophosphates were much more active than the isomeric lower alkyl 2,2,2 trichloroethyl thiophosphates as nematocides, with O,O-diethyl-S-(1,2,2-trichloroethyl) thiophosphate being the most active nematocide listed.

The lower alkyl 1,2,2 and 2,2,2-trichloroethyl thiophosphates were the most effective bactericides against the organisms tested.

The compounds exhibited fungicidal activity. Effectiveness was dependant to some extent upon the fungus tested aaginst. O,O-diethyl-S-(2,2,2-trichloroethyl) thiophosphate was best against pythium spp. and O,O-diphenyl-S-(2,2,2-trichloroethyl) thiophosphate proved best against Stemphyllium. The lower alkyl and phenyl 2,2,2-trichloroethyl thiophosphates in general appeared to be better fungicides than DDVP while the other lower alkyl and phenyl polyhalo vinyl or polyhalo ethyl compounds within the present invention were about as effective as DDVP as fungicides.

The lower alkyl dichlorovinyl thiophosphates were good insecticides against house flies (*Musca domestica*) and the Mexican bean beetle (*Epilachna varivestis*).

The compounds of the present invention are prepared by reacting the appropriate dihydrocarbon or dihaloaryl phosphite with a polyhalo vinyl sulfenyl halide or polyhalo ethyl sulfenyl halide. Examples of such sulfenyl halides are 1,2-dichlorovinyl sulfenyl chloride, 1,2-dibromovinyl sulfenyl bromide and 1,2,2-trichloroethyl sulfenyl chloride. The HCl formed is removed under reduced pressure or by neutralizing the crude reaction mixture obtained.

The temperature of reaction can be varied, e.g., room temperature can be employed. However, preferably the reaction is initiated at lower temperatures since the sulfenyl halides have a tendency to decompose at elevated temperatures.

The general procedure employed in Examples 1–15 for preparing the unsaturated thiophosphates and the saturated thiophosphates was as follows:

A known quantity of dialkyl or diphenyl phosphite was dissolved in 2–3 parts of dry carbon tetrachloride as a solvent and cooled to 0° C. by means of an ice bath. The apparatus was protected from atmospheric moisture and connected to a 200–250 mm. Hg vacuum, which was applied throughout the tool reaction period to assist in removal of the HCl formed. Slightly less than an equimolar quantity of the desired sulfenyl chloride was then added dropwise to the well stirred dihydrocarbon phosphite-carbon tetrachloride solution. The addition rate was adjusted to maintain the reaction temperature between 4 and 8° C. For 0.1 molar quantities, 30 to 40 minute periods were necessary for this operation. In all cases, the reaction rates were very high and easily visible by the almost instantaneous decoloration of the reacting sulfenyl chlorides, which are of distinct orange to dark red colors.

Toward the end of the sulfenyl chloride addition, however, the reaction slowed down considerably. The reaction mixture was allowed to warm to room temperature and stirred for 1–1.5 hours at that temperature to complete the reaction. In many cases the products were left overnight at room temperature before the isolation of the desired reaction product was undertaken.

The vacuum was then disconnected, the mixture cooled to 0–5° C. and water was added slowly with stirring at a temperature not over 15° C. The product was transferred to a separatory funnel, the separated carbon tetrachloride solution washed with dilute sodium bicarbonate and the acid free organic layer thus obtained dried over anhydrous magnesium sulfate. The product was stripped to yield the desired product in yields ranging from 75% to quantitative. The final products were of high purity and were colorless to pale yellow oils having a high solubility in most common organic solvents. Purification was accomplished by distillation in a high vacuum.

Unless otherwise indicated all parts and percentages are by weight.

*Example 1*

6.74 grams (0.061 mol) of dimethyl phosphite were dissolved in 20 ml. of dry carbon tetrachloride and treated in the manner described above with 8.5 grams (0.052 mole) of 1,2-dichlorovinyl sulfenyl chloride to give 9.2 grams or a 75% yield of crude O,O-dimethyl-S-(1,2-dichlorovinyl) thiophosphate as a yellow oil $n_D^{27}$ 1.5184, $d_{20}^{20}$ 1.4744. Upon purification the product was a colorless oil boiling at 87° C. 0.018 mm. Hg, $n_D^{20}$ 1.5174, Cl 32.5% (theory 30.0%), P 12.3% (theory 13.0%), S 13.4% (theory 13.5%). The infrared spectrum showed a strong absorption at 1560 cm.$^{-1}$ for the C=C double bond, P=O and P—O—C peaks at 1270 and 1050–1000 cm.$^{-1}$ respectively and strong C—Cl absorptions at 840–760 cm.$^{-1}$.

*Example 2*

8.0 grams (0.058 mol) of diethyl phosphite were dissolved in 20 ml. of dry carbon tetrachloride and treated in the manner described above with 8.4 grams (0.051 mol) of 1,2-dichlorovinyl sulfenyl chloride to give 12.0 grams (92% yield) of almost pure O,O-diethyl-S-(1,2-dichlorovinyl) thiophosphate, $n_D^{27}$ 1.4969, as a colorless oil. Upon purification, the product distilled at 81–82° C. at 0.008 mm. Hg, $n_D^{25}$ 1.4980, $d_{20}^{20}$ 1.3208, Cl 26.3% (theory 27.9%), P 11.6% (theory 12.2%), S 11.3% (theory 12.6%).

The infrared spectrum showed a C=C double bond peak at 1570 cm.$^{-1}$, C—Cl peaks at 750–820 cm.$^{-1}$, P=O absorption at 1280 cm.$^{-1}$ and P—O—C at 950–1070 cm.$^{-1}$.

*Example 3*

11.9 grams (0.061 mol) of dibutyl phosphite were dissolved in 20 ml. of dry carbon tetrachloride and treated in the manner described above with 10 grams (0.061 mol) of 1,2-dichlorovinyl sulfenyl chloride to give 19.0 grams (97%) of crude O,O-dibutyl-S-(1,2-dichlorovinyl) thiophosphate as a pale yellow oil, $n_D^{27}$ 1.4855, $d_{20}^{20}$ 1.1828. On purification it distilled at 143–147° C. at 0.045–0.050 mm. Hg accompanied by some decomposition, Cl 20.5% (theory 22.1%), P 10.0% (theory 9.65%, S 9.3% (theory 9.99%).

The infrared spectrum showed typical absorptions at 1560 cm.$^{-1}$ for the C=C bond, at 1270 cm.$^{-1}$ for the P=O bond, at 960–1050 cm.$^{-1}$ for P—O—C and at 785–820 cm.$^{-1}$ for the C—Cl bond.

*Example 4*

14.32 grams (0.061 mol) of diphenyl phosphite were dissolved in 20 ml. of dry carbon tetrachloride and treated in the manner described above with 10 grams (0.061 mol) of 1,2-dichlorovinyl sulfenyl chloride to give 22.1 grams (a quantitative yield) of crude O,O-diphenyl-S-(1,2-dichlorovinyl) thiophosphate as a yellow oil, $n_D^{27}$ 1.5807, $d_{10}^{20}$ 1.3699, Cl 20.7% (theory 19.6%), P 7.9% (theory 8.59%), S 8.3% (theory 8.94%). The purified product distilled at 190–200° C. at 0.08–0.1 mm. Hg with some decomposition and had an $n_D^{27}$ 1.5829. The infrared spectrum showed absorptions at 1570 cm.$^{-1}$ for the C=C bond, at 1275 cm.$^{-1}$ for P=O, at 950–1030 cm.$^{-1}$ for P—O—C and at 750–830 cm.$^{-1}$ for C—Cl.

*Example 5*

7.0 grams (0.063 mol) of dimethyl phosphite were dissolved in 30 ml. of dry carbon tetrachloride and treated in the manner described above with 10 grams (0.062 mol) of 2,2-dichlorovinyl sulfenyl chloride to give 11.5 grams (80% yield) of crude O,O-dimethyl-S-(2,2-dichlorovinyl) thiophosphate, $n_D^{25}$ 1.5150 which distilled at 71–73° C. at 0.007 mm. Hg as a colorless oil, $n_D^{25}$ 1.5146, $d_{20}^{20}$ 1.452, Cl 30.8% (theory 29.9%), S 13.2% (theory 13.5%), P 12.8% (theory 13.0%). The infrared spectrum showed peaks at 1565 cm.$^{-1}$ (C=C), 1270 cm.$^{-1}$ (P=O), 1000–1060 cm.$^{-1}$ (P—O—C) and at 760–830 cm.$^{-1}$ (C—Cl).

*Example 6*

8.6 grams (0.062 mol) of diethyl phosphite were dissolved in 30 ml. of dry carbon tetrachloride and treated in the manner described above with 10 grams (0.062 mol) of 2,2-dichlorovinyl sulfenyl chloride to give 14.6 grams (94.2% yield) of crude O,O-diethyl-S-(2,2-dichlorovinyl) thiophosphate, $n_D^{25}$ 1.5004 which distilled at 84–86° C. at 0.007 mm. Hg as a colorless oil, $n_D^{25}$ 1.4994, $d_{20}^{20}$ 1.328, Cl 28.7% (theory 27.9%), S 11.9% (theory 12.6%), P 11.5% (theory 12.2%). The infrared spectrum showed peaks at 1570 cm.$^{-1}$ (C=C), 1260 cm.$^{-1}$ (P=O), 980–1080 cm.$^{-1}$ (P—O—C) and at 750–820 cm.$^{-1}$ (C—Cl).

Example 7

14.3 grams (0.061 mol) of diphenyl phosphite were dissolved in 30 ml. of dry carbon tetrachloride and treated in the manner described above with 10 grams (0.061) of 2,2-dichlorovinyl sulfenyl chloride to give 19.0 grams (86% yield) of crude O,O-diphenyl-S-(2,2-dichlorovinyl) thiophosphate as a faintly yellow oil, $n_D^{25}$ 1.5832. The pure O,O-diphenyl-S-(2,2-dichlorovinyl) thiophosphate distilled at 171–172° C. at 0.015–0.018 mm. Hg as a pale yellow oil, $n_D^{25}$ 1.5821, $d_{20}^{20}$ 1.362, Cl 20.0% (theory 19.6%), S 9.1% (theory 8.94%), P 8.0% (theory 8.5%). The infrared spectrum showed peaks at 1580 cm.$^{-1}$ (C=C), 1280 cm.$^{-1}$ (P=O), 900–1040 cm.$^{-1}$ (P—O—C) and at 740–820 cm.$^{-1}$ (C—Cl).

Example 8

7.0 grams (0.050 mol) of diethyl phosphite were dissolved in 20 ml. of dry carbon tetrachloride and treated in the general manner described above with 8.8 gm. (0.044 mol) perchlorovinyl sulfenyl chloride to give 11.5 grams (90% yield) of crude O,O-diethyl-S-(perchlorovinyl) thiophosphate as a pale yellow oil, $n_D^{27}$ 1.5141, which distilled with decomposition at 104–106° C. at 0.03 mm. Hg to give a pale yellow oil, $n_D^{27}$ 1.5141, $d_{20}^{20}$ 1.4247, Cl 36.4% (theory 37.1%), P 9.8% (theory 10.78%). The infrared spectrum showed peaks at 1550 cm.$^{-1}$ (C=C), 1272 cm.$^{-1}$ (P=O), 990–1070 cm.$^{-1}$ (P—O—C) and at 750–800 cm.$^{-1}$ (C—Cl).

Example 9

9.0 grams (0.082 mol) of dimethyl phosphite were dissolved in 20 ml. of dry carbon tetrachloride and treated in the manner described above with 15 grams (0.075 mol) of 1,2,2-trichloroethyl sulfenyl chloride to give 17.5 grams (85% yield) of practically pure O,O-dimethyl-S-(1,2,2-trichloroethyl) thiophosphate as a dark yellow oil, $n_D^{28}$ 1.5112. Distillation proceeded without decomposition at 113–114° C. at 0.06 mm. Hg to give the pure product as a yellow oil, $n_D^{28}$ 1.5120, $d_{20}^{20}$ 1.5254, Cl 39.3% (theory 38.9%), S 11.5% (theory 11.7%), P 11.4% (theory 11.3%). The infrared spectrum showed absorptions at 1275 cm.$^{-1}$ (P=O), 1010–1070 cm.$^{-1}$ (P—O—C) and at 725 and 750–810 cm.$^{-1}$ (C—Cl). The C=C peak at about 1560 cm.$^{-1}$ was missing.

Example 10

11 grams (0.079 mol) of diethyl phosphite were dissolved in 20 ml. of dry carbon tetrachloride and treated in the manner described above with 14.5 grams (0.072 mol) of 1,2,2-trichloroethyl sulfenyl chloride to give 20.0 grams (95% yield) of O,O-diethyl-S-(1,2,2-trichloroethyl) thiophosphate as an almost colorless oil, $n_D^{27.5}$ 1.4959, $d_{20}^{20}$ 1.3909. The pure product distilled at 114–115° C. at 0.04 mm. Hg and was found to have $n_D^{25}$ 1.4978, $d_{20}^{20}$ 1.3962, Cl 35.5% (theory 35.3%), S 9.7% (theory 11.0%), P 10.3% (theory 10.6%). The infrared spectrum showed absorptions at 1270 cm.$^{-1}$ (P=O), 1000–1060 cm.$^{-1}$ (P—O—C) and at 720 and 760–800 cm.$^{-1}$ (C—Cl). The C=C peaks were missing.

Example 11

9.71 grams (0.05 mol) of dibutyl phosphite were dissolved in 20 ml. of dry carbon tetrachloride and treated in the manner described above with 10 grams (0.05 mol) of 1,2,2-trichloroethyl sulfenyl chloride gave 17.7 grams (99% yield) of O,O-dibutyl-S-(1,2,2-trichloroethyl) thiophosphate as a pale yellow oil, $n_D^{28}$ 1.4861, $d_{20}^{20}$ 1.2582. It distilled at 155° C. at 0.05 mm. Hg accompanied by some decomposition, $n_D^{28}$ 1.4868, Cl 29.5% (theory 29.8%), P 8.6% (theory 8.67%), S 8.7% (theory 8.9%). The infrared spectrum showed absorption at 1260 cm.$^{-1}$ (P=O), 990–1060 cm.$^{-1}$ (P—O—C) and at 720 and 780 cm.$^{-1}$ (C—Cl). The C=C absorptions were missing.

Example 12

15.3 grams (0.05 mol) of O,O di-(2-ethylhexyl) phosphite were dissolved in 20 ml. of dry carbon tetrachloride and treated in the manner described above with 10 grams (0.05 mol) of 1,2,2-trichloroethyl sulfenyl chloride to give O,O-di(2-ethylhexyl)-S-(1,2,2-trichloroethyl) thiophosphate as a pale yellow oil, $n_D^{18}$ 1.4778, $d_{20}^{20}$ 1.1183, Cl 24.4% (theory 22.6%), P 6.1% (theory 6.6%). The infrared spectrum was similar to the other polychloroethyl thiophosphates with absorptions at 1250 cm.$^{-1}$ (P=O), 990–1040 cm.$^{-1}$ (P—O—C) and at 720 and 780 cm.$^{-1}$ (C—Cl). The C=C absorptions were missing.

Example 13

5.0 grams (0.045 mol) of dimethyl phosphite were dissolved in 20 ml. of dry carbon tetrachloride and treated in the manner described above with 10 grams (0.05 mol) of 2,2,2-trichloroethyl sulfenyl chloride to give 11.5 grams (about 90% yield) of crude O,O-dimethyl-S-(2,2,2-trichloroethyl) thiophosphate as a colorless oil, $n_D^{25}$ 1.5110 which distilled at 92–93° C. at 0.012 mm. Hg, $n_D^{25}$ 1.5101, $d_{20}^{20}$ 1.523, Cl 40.1% (theory 38.9%), S 12.5% (theory 11.7%), P 10.6% (theory 11.3%). The infrared spectrum showed absorption at 1260 cm.$^{-1}$ (P=O), 1000–1060 cm.$^{-1}$ (P—O—C) and at 700–725 and 760–810 cm.$^{-1}$ (C—Cl). The C=C absorptions were missing.

Example 14

6 grams (0.044 mol) of diethyl phosphite were dissolved in 20 ml. of dry carbon tetrachloride and treated in the manner described above with 10 grams (0.05 mol) of 2,2,2-trichloroethyl sulfenyl chloride to give 13.6 grams (quantitative yield) of O,O-diethyl-S-(2,2,2-trichloroethyl) thiophosphate as an almost colorless oil, $n_D^{25}$ 1.4998, $d_{20}^{20}$ 1.406. It distilled at 106–108° C. at 0.019 mm. Hg as a colorless oil, $n_D^{25}$ 1.4990, Cl 37.0% (theory 35.3%), S 11.4% (theory 10.63%), P 9.5% (theory 10.3%). The infrared spectrum showed absorptions at 1250 cm.$^{-1}$ (P=O), 990–1040 cm.$^{-1}$ (P—O—C) and at 700–725 and 750–800 cm.$^{-1}$ (C—Cl). The C=C absorptions were missing.

Example 15

10 grams (0.043 mol) of diphenyl phosphite were dissolved in 30 ml. of dry carbon tetrachloride and treated in the manner described above with 10 grams (0.05 mol) of 2,2,2-trichloroethyl sulfenyl chloride to give 16.9 grams (quantitative yield) of O,O-diphenyl-S-(2,2,2-trichloroethyl) thiophosphate as a pale yellow oil, $n_D^{25}$ 1.5732, $d_{20}^{20}$ 1.421. The pure product distilled at 182–3° C. at 0.018 mm. Hg as a heavy yellow oil, $n_D^{25}$ 1.5749, $d_{20}^{20}$ 1.421, Cl 29.5% (theory 26.75%), S 8.4% (theory 8.07%), P 6.8% (theory 7.8%). The infrared spectrum showed absorptions at 1250–1290 cm.$^{-1}$ (P=O), 1000–1030 cm.$^{-1}$ (P—O—C) and at 690–720 and 750–790 cm.$^{-1}$ (C—Cl). The C=C absorption was missing.

The O,O-dialkyl and diaryl-S-polyhalo vinyl thiophosphates are preferably prepared as indicated above. They can also be prepared from the corresponding polyhalo ethyl thiophosphates having one more halogen atom by dehydrohalogenation as shown below.

Example 16

7.0 grams (0.024 mol) of O,O-diethyl-S-(1,2,2-trichloroethyl) thiophosphate were dissolved in 30 ml. of chloroform and treated dropwise with a solution of 2.5 grams (0.024 mol) of triethyl amine in 10 ml. of chloroform at room temperature over a period of 30 minutes. The triethyl amine hydrochloride formed remained completely dissolved forming a bright yellow solution at the end of the reaction. After standing overnight, heating for 1 hour at 50–60° C., and cooling to room temperature, washing the chloroform with water, dilute hydrochloric acid, dilute sodium bicarbonate and again with water to free the solution of triethyl amine hydrochloride and unreacted triethyl amine and drying over anhydrous magnesium sulfate and recovering the solvent in a vacuum there was obtained 6 grams (86% yield) of crude, O,O-diethyl-S-(1,2-dichlorovinyl) thiophosphate as a brown oil, $n_D^{27}$ 1.4990. The infrared spectrum was found to be very similar to that of the product of Example 2 but there was a marked decrease in the absorption for the olefinic double bond at 1570 cm.$^{-1}$ due to the fact there was a considerable amount of the unreacted O,O-diethyl-S-(1,2,2-trichloroethyl) monothiophosphate.

In similar manner O,O-dimethyl-S-(1,2-dichlorovinyl) thiophosphate was obtained in poor yields from O,O-dimethyl-S-(1,2,2-trichloroethyl) thiophosphate. The solvent employed in this case was ether rather than chloroform.

Example 17

To 7 grams (0.019 mol) of O,O-dibutyl-S-(1,2,2-trichloroethyl) thiophosphate dissolved in 30 ml. of dry benzene were added with stirring 2.0 grams (0.019 mol) of triethyl amine in 10 ml. of benzene dropwise at room temperature over a period of 30 minutes. Standing overnight at room temperature, heating for 1 hour at 50–60° C. and cooling to room temperature and washing the benzene solution free of triethyl amine hydrochloride and unreacted triethyl amine as described in Example 16, drying over anhydrous magnesium sulfate and stripping off the solvent gave 5.5 grams (87% yield) of crude O,O-dibutyl-S-(1,2-dichlorovinyl) thiophosphate as a dark oil, $n_D^{27}$ 1.4800. The infrared spectrum was very similar to that of the product in Example 3 but the absorption for the olefinic double bond at 1580 cm.$^{-1}$ was greatly reduced indicating that the product of this example was not as pure as that of Example 3.

In place of triethyl amine there can be used any other conventional hydrochloric acid acceptors, e.g., other tertiary alkyl amines such as tributyl amine, tricyclohexyl amine, aryl amines, e.g., N,N-dimethyl aniline, N,N-diethyl aniline, heterocyclic amines, e.g., pyridine and N-methyl piperidine as well as inorganic bases such as potassium bicarbonate and the like.

The compounds of the present invention can be used alone as nematocides, fungicides, bactericides and insecticides but it has been found desirable to apply them to the pest, e.g., to the soil habitat of nematodes, together with inert solids to form dusts, or more preferably suspended in a suitable liquid diluent, preferably water. There can also be added surface active agents and inert solids in such liquid formulations. Desirably, 0.05–1% by weight of surface active agent is employed. The active ingredient can be from 0.01 to 95% by weight of the entire composition in such cases.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, isopropanol and amyl alcohol, etc.

The novel pesticides can also be applied as aerosols, e.g., by dispersing them in air by means of a compressed gas such as dichlorodifluoromethane or trichlorofluoromethane and other Freons, for example.

The pesticides of the present invention can also be applied with inert nematocidal, fungicidal, bactericidal or insecticidal adjuvants or carriers such as talc, pyrophyllite, synthetic fine silica, Attaclay, kieselgahr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the pesticidal compositions of this invention. Such surface active agents, i.e., wetting agent, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonic salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenol-ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethyl hexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey Red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g., Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

The solid and liquid formulations can be prepared by any of the conventional methods. Thus the active ingredient can be mixed with the solid carrier in finely divided form in amounts small enough to preserve the free-flowing property of the final dust composition.

In the following examples or tables illustrating nematocidal activity the thiophosphates were formulated as wettable powders consisting of 50% thiophosphate, 46% Hi-Sil 233 (ultra fine silica), 2% Marasperse N (sodium lignin sulfonate) and 2% Pluronic L-61 (polyethylene oxide-propylene oxide molecular weight about 1000). This wettable powder is hereinafter designated as Formulation A.

These 50% by weight thiophosphate containing wettable powders were diluted with water to such an extent as to obtain final concentrations of the thiophosphates of 200, 100, 50, 25 and 12.5 p.p.m. during the actual tests.

The saprophytic nematode tests were carried out in water as the medium with Panagrellus and Rhabditis spp. at room temperature. The results were recorded as percent kill after a 4-day incubation period. In Table 1 there was used an impure mixture of 60% of the indicated O,O - dialkyl-S-(1,2 - dichlorovinyl) thiophosphate with 40% of the corresponding dialkyl-S-(1,2,2-trichloroethyl) thiophosphate.

TABLE 1

| Compound | Percent Kill of Saprophytic Nematodes at Rates of— | | | | |
|---|---|---|---|---|---|
| | 200 p.p.m. | 100 p.p.m. | 50 p.p.m. | 25 p.p.m. | 12.5 p.p.m. |
| Dimethyl | 100 | 60 | 40 | 30 | 30 |
| Diethyl | 90 | 70 | 70 | 70 | 70 |
| Dibutyl | 60 | 40 | 40 | 40 | 10 |
| Di-2-ethylhexyl | 30 | 10 | 10 | 10 | 10 |

Table 2 was a test against the same saprophytic nematodes but utilizing pure polychlorovinyl triophosphates in Formulation A rather than the impure mixtures. The results are expressed in percent kill at the indicated concentrations. In a blank run the mortality was 5%.

TABLE 2

| Compound | 200 p.p.m. | 100 p.p.m. | 50 p.p.m. | 25 p.p.m. | 12.5 p.p.m. |
|---|---|---|---|---|---|
| $(MeO)_2P(O)SCClCHCl$ | 100 | 100 | 70 | 30 | 5 |
| $(EtO)_2P(O)SCClCHCl$ | 100 | 100 | 100 | 80 | 80 |
| $(BuO)_2P(O)SCClCHCl$ | 70 | 70 | 30 | 5 | 5 |
| $(MeO)_2P(O)SCHCCl_2$ | 100 | 100 | 30 | 5 | 5 |
| $(EtO)_2P(O)SCHCCl_2$ | 100 | 100 | 80 | 50 | 50 |
| $(PhO)_2P(O)SCClCHCl$ | 70 | 50 | 50 | 5 | 5 |
| $(PhO)_2P(O)SCHCCl_2$ | 70 | 50 | 50 | 30 | 5 |
| $(EtO)_2P(O)SCClOCl_2$ | 100 | 100 | 100 | 80 | 80 |

Table 3 was a test against the same saprophytic nematodes but utilizing pure polychloroethyl thiophosphates in Formulation A rather than polychlorovinyl compounds. The results are expressed in percent kill at the indicated concentrations. In a blank run the mortality was 5%.

TABLE 3

| Compound | 200 p.p.m. | 100 p.p.m. | 50 p.p.m. | 25 p.p.m. | 12.5 p.p.m. |
|---|---|---|---|---|---|
| $(MeO)_2P(O)SCHClCHCl_2$ | 100 | 100 | 80 | 80 | 80 |
| $(EtO)_2P(O)SCHClCHCl_2$ | 100 | 100 | 100 | 100 | 80 |
| $(2-EtHexO)_2P(O)SCHClCHCl_2$ | 20 | 5 | 5 | 5 | 5 |
| $(MeO)_2P(O)SCH_2CCl_3$ | 100 | 60 | 30 | 5 | 5 |
| $(EtO)_2P(O)SCH_2CCl_3$ | 100 | 80 | 30 | 5 | 5 |
| $(PhO)_2P(O)SCH_2CCl_3$ | 30 | 5 | 5 | 5 | 5 | variety gave the poorest results with the particular bacteria and concentrations tested. The methyl and ethyl trichloroethyl thiophosphates showed considerably better bactericidal action than DDVP. In Table 4 "a" indicates bactericidal activity at the concentration employed and "n" indicates no activity.

TABLE 4

| Compound | Erwinia carotovora | | Pseudomonas coronafacions | | Xanthomonas vesicatoria | |
|---|---|---|---|---|---|---|
| | 1,000 p.p.m. | 100 p.p.m. | 1,000 p.p.m. | 100 p.p.m. | 1,000 p.p.m. | 100 p.p.m. |
| $(MeO)_2P(O) S-CCl=CHCl$ | a | n | n | n | a | n |
| $(MeO)_2P(O) SCH=CCl_2$ | a | n | n | n | n | n |
| $(EtO)_2P(O) SCH=CCl_2$ | n | n | a | n | n | n |
| $(PhO)_2P(O) SCCl=CHCl$ | n | n | a | n | a | n |
| $(PhO)_2(O) SCH=CCl_2$ | n | n | a | n | a | n |
| $(EtO)_2P(O) SCCl=CCl_2$ | a | n | a | n | n | n |
| $(MeO)_2P(O) SCHClCHCl_2$ | a | n | a | a | a | n |
| $(EtO)_2P(O) SCHClCHCl_2$ | a | a | a | a | n | n |
| $(2-EtHexO)_2P(O) SCHClCHCl_2$ | n | n | a | n | a | n |
| $(MeO)_2P(O) SCH_2CCl_3$ | a | a | a | a | n | n |
| $(EtO)_2P(O) SCH_2CCl_3$ | a | a | n | n | n | n |
| $(PhO)_2P(O) SCH_2CCl_3$ | n | n | n | n | a | n |

The pure compounds were also tested as bactericides as indicated in Table 4. The compounds were incorporated in Formulation A and this mixture added to an agar culture of the bacteria. The saturated compounds exhibited better bactericidal action than the polychlorovinyl thiophosphates. The 1,2-dichlorovinyl compounds were relatively poor as bactericides. The dibutyl substituted compounds of both the saturated and unsaturated The pure compounds were also tested as fungicides in plate fungicide tests as indicated in Table 5. The compounds were made up into Formulation A and then added to agar cultures of the fungi. In the table, 10 indicates 100% effectiveness and 0 indicates no effectiveness. In Table 5, P stands for Pythium spp., F for Fusarium, R for Rhizoctonia, H for Helminthosporium and S for Stemphyllium sarcinaeformae.

TABLE 5

| Compound | P | | F | | R | | H | | S | |
|---|---|---|---|---|---|---|---|---|---|---|
| | 1,000 p.p.m. | 100 p.p.m. | 1,000 p.p.m. | 100 p.p.m. | 1,000 p.p.m. | 100 p.p.m. | 1,000 p.p.m. | 100 p.p.m. | 1,000 p.p.m. | 100 p.p.m. |
| $(MeO)_2P(O)SCClCHCl$ | 10 | 0 | 3 | 0 | 0 | 0 | 0 | 0 | 5 | 0 |
| $(EtO)_2P(O)SCClCHCl$ | 10 | 0 | 0 | 0 | 6 | 0 | 0 | 0 | 4 | 0 |
| $(BuO)_2P(O)SCClCHCl$ | 0 | 0 | 0 | 0 | 0 | 0 | 5 | 0 | 0 | 0 |
| $(2-EtHexO)_2P(O)SCClCHCl$ | 8 | 0 | 3 | 0 | 0 | 0 | 5 | 0 | 2 | 0 |
| $(PhO)_2P(O)SCClCHCl$ | 10 | 0 | 4 | 0 | 2 | 0 | 0 | 0 | 8 | 4 |
| $(MeO)_2P(O)SCHCCl_2$ | 10 | 0 | 5 | 0 | 0 | 0 | 3 | 0 | 5 | 0 |
| $(EtO)_2P(O)SCHCCl_2$ | 4 | 0 | 0 | 0 | 3 | 0 | 0 | 0 | 6 | 0 |
| $(PhO)_2P(O)SCHCCl_2$ | 10 | 4 | 0 | 0 | 5 | 0 | 4 | 1 | 0 | 0 |
| $(EtO)_2P(O)SCClCCl_2$ | 0 | 0 | 2 | 0 | 4 | 0 | 0 | 0 | 6 | 0 |
| $(MeO)_2P(O)SCHClCHCl_2$ | 10 | 6 | 0 | 0 | 6 | 1 | 0 | 0 | 10 | 0 |
| $(EtO)_2P(O)SCHClCHCl_2$ | 0 | 0 | 0 | 0 | 5 | 1 | 4 | 0 | 0 | 0 |
| $(BuO)_2P(O)SCHClCHCl_2$ | 4 | 0 | 0 | 0 | 0 | 0 | 4 | 0 | 0 | 0 |
| $(2-EtHexO)_2P(O)SCHClCHCl_2$ | 10 | 6 | 0 | 0 | 8 | 2 | 0 | 0 | 0 | 0 |
| $(MeO)_2P(O)SCH_2CCl_3$ | 10 | 4 | 2 | 0 | 4 | 0 | 0 | 0 | 6 | 0 |
| $(EtO)_2P(O)SCH_2CCl_3$ | 10 | 10 | 3 | 0 | 0 | 0 | 4 | 0 | 0 | 0 |
| $(PhO)_2P(O)SCH_2CCl_3$ | 10 | 4 | 0 | 0 | 0 | 0 | 0 | 0 | 10 | 10 |

The pure compounds were also tested as insecticides against house flies (*Musca domestica*) and the Mexican beans beetle (*Epilachna varivestis*). For these tests the compounds were made up as an aqueous spray. In the test against flies the standard Peet-Grady test was employed. In the test against the Mexican bean beetles the aqueous dispersion was sprayed on bean plants. (Instead of spraying the thiophosphates on the plants they can be sprayed on the ground surrounding the plants.) The results as percent kill are shown in Table 6.

TABLE 6

| Compound | Flies | | Beetles 1,000 p.p.m. |
|---|---|---|---|
| | 10,000 p.p.m. | 1,000 p.p.m. | |
| (MeO)₂P(O)SCCl=CHCl | 100 | 45 | 93 |
| (EtO)₂P(O)SCCl=CHCl | 100 | 85 | 100 |
| (MeO)₂P(O)SCH=CCl₂ | 100 | 81 | 100 |
| (EtO)₂P(O)SCH=CCl₂ | 100 | 81 | 100 |
| (PhO)₂P(O)SCCl=CHCl | 46 | 0 | 77 |
| (EtO)₂P(O)SCCl=CCl₂ | 74 | 0 | 69 |

The polyhaloethyl thiophosphates can also be be used as insecticides against house flies and Mexican bean beetles.

We claim:

1. O,O,-dialkyl-S-(2,2,2-trichloroethyl) monothiophosphates having the formula

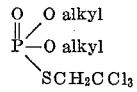

and wherein the alkyl groups have 1–2 carbon atoms.

2. A method of preparing a compound having the formula

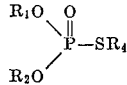

wherein R₁ and R₂ are selected from the group consisting of alkyl, phenyl, alkyl phenyl and halophenyl, and R₄ is selected from the group consisting of di- to tetrahaloethyl and di- to trihalovinyl, the halo atoms of said compound having atomic weight between 35 and 80 and not over one of said halo atoms of R₄ is the 1 position, said method comprising reacting a compound having the formula

with a member of the group consisting of a polyhalovinyl sulfenyl chloride and a polyhaloethyl sulfenyl chloride in which sulfenyl chloride not more than one halo atom is in the 1 position and removing the hydrogen chloride formed by evacuation at reduced pressure.

3. A process according to claim 2 wherein all halogen atoms of the sulfenyl chloride are chlorine atoms.

4. A method of preparing an O,O-dialkyl-S-(trichloroethyl) monothiophosphate wherein at least two of the chlorines are in the 2 position comprising reacting a dialkyl phosphite with a trichloroethyl sulfenyl chloride in which sulfenyl chloride not more than one chloro atom is in the 1 position, and removing the hydrogen chloride formed by evacuation at reduced pressure.

5. A method of preparing O,O-dialkyl-S-(1,2,2-trichlorethyl) monothiophosphate comprising reacting a dialkyl phosphite in which the alkyl groups have 1 to 2 carbon atoms with 1,2,2-trichlorethyl sulfenyl chloride, and removing the hydrogen chloride formed by evacuation at reduced pressure.

6. A method of preparing O,O-dialkyl-S-(2,2,2-trichlorethyl) monothiophosphate comprising reacting a dialkyl phosphite in which the alkyl groups have 1 to 2 carbon atoms with 2,2,2-trichlorethyl sulfenyl chloride, and removing the hydrogen chloride formed by evacuation at reduced pressure.

7. A method of preparing an O,O-dialkyl-S-(dichlorovinyl) monothiophosphate wherein at least two of the chlorines are in the 2 position comprising reacting a dialkyl phosphite with a dichlorovinyl sulfenyl chloride in which sulfenyl chloride not more than one chloro atom is in the 1 position, and removing the hydrogen chloride formed by evacuation at reduced pressure.

8. A method of preparing O,O-dialkyl-S-(1,2-dichlorovinyl) monothiophosphate comprising reacting a dialkyl phosphite in which the alkyl groups have 1 to 2 carbon atoms with 1,2-dichlorovinyl sulfenyl chloride, and removing the hydrogen chloride formed by evacuation at reduced pressure.

9. A method of preparing O,O-dialkyl-S-(2,2-dichlorovinyl) monothiophosphate comprising reacting a dialkyl phosphite in which the alkyl groups have 1 to 2 carbon atoms with 2,2-dichlorovinyl sulfenyl chloride, and removing the hydrogen chloride formed by evacuation at reduced pressure.

References Cited by the Examiner

UNITED STATES PATENTS

| 2,690,451 | 9/1954 | Gilbert et al. | 260—461 |
| 2,811,543 | 10/1957 | Coover et al. | 260—461 |
| 2,928,863 | 3/1960 | Schrader | 260—461 |
| 2,931,755 | 4/1960 | Birum | 260—461 XR |
| 2,947,773 | 8/1960 | Allen | 260—461 |
| 3,027,296 | 3/1962 | Whetstone | 260—461 XR |
| 3,093,536 | 6/1963 | Loeffler | 260—461 XR |
| 3,116,201 | 12/1963 | Whetstone et al. | 260—461 |

FOREIGN PATENTS

| 1,089,376 | 9/1960 | Germany. |
| 783,697 | 9/1957 | Great Britain. |

CHARLES B. PARKER, *Primary Examiner.*

FRANK M. SIKORA, JOSEPH P. BRUST,
*Assistant Examiners.*